United States Patent [19]

Harding et al.

[11] Patent Number: 4,617,984
[45] Date of Patent: Oct. 21, 1986

[54] METHOD OF INDIRECT LIQUID-PHASE HEAT TRANSFER

[75] Inventors: Ronald H. Harding, Westport, Conn.; George E. Totten, West Haverstraw, N.Y.

[73] Assignee: Union Carbide Corporation, Danbury, Conn.

[21] Appl. No.: 749,772

[22] Filed: Jun. 28, 1985

[51] Int. Cl.[4] .......................... F28F 23/00; C09K 5/00
[52] U.S. Cl. .................................... 165/1; 165/104.19; 252/52 A; 252/73; 252/77; 252/78.1; 568/580; 568/581; 568/582; 568/617; 568/622; 568/625
[58] Field of Search ............................. 165/1, 104.19; 252/52 A, 73, 77, 78.1; 568/580, 581, 582, 617, 622, 625

[56]  References Cited
U.S. PATENT DOCUMENTS

| 2,425,845 | 8/1947 | Toussaint et al. | 252/73 |
| 2,448,664 | 9/1948 | Fife et al. | 568/622 |
| 2,665,312 | 1/1954 | Ohlmann et al. | 260/611.5 |
| 2,677,700 | 5/1954 | Jackson et al. | 568/622 |
| 2,786,080 | 3/1957 | Patton, Jr. | 568/582 |
| 3,185,735 | 5/1965 | Leis et al. | 260/611.5 |
| 3,324,035 | 6/1967 | Nankee et al. | 568/625 |
| 3,425,999 | 2/1969 | Axelrood et al. | 260/77.5 |
| 4,259,405 | 3/1981 | Newkirk | 428/385 |

FOREIGN PATENT DOCUMENTS 31459  3/1979  Japan .

Primary Examiner—Paul Lieberman
Assistant Examiner—Robert A. Wax
Attorney, Agent, or Firm—Karen E. Klumas

[57] ABSTRACT

A method of indirect liquid phase heat transfer utilizing as a heat transfer fluid a composition comprising polytetra(methylene oxide) or poly(trimethylene oxide) homopolymers having molecular weights of from about 300 to about 1,000.

13 Claims, 1 Drawing Figure

METHOD OF INDIRECT LIQUID-PHASE HEAT TRANSFER

BACKGROUND OF THE INVENTION

1. Field of the Invention

This invention relates to a method of indirect liquid-phase heat transfer using as a heat transfer fluid in a high temperature, continuously circulating system a substantially anhydrous composition comprising poly(trimethylene oxide), poly(tetramethylene oxide) or mixtures thereof.

2. Prior Art Discussion

Ideally, an indirect liquid phase heat transfer fluid suitable for use in a high temperature, continuously circulating system should provide a broad range of service temperatures, have a sufficiently low viscosity to provide an acceptable rate of heat transfer and minimized operating expenses, have a sufficiently low freezing point to reduce start-up and pumping problems at lower temperatures, have sufficient lubricity that stress on pumps, valves and other system parts is minimized, decompose at a desirably slow rate in use and resist the formation of system-fouling degradation products.

Numerous compositions have been suggested for use as indirect liquid-phase heat transfer fluids. Exemplary of some of these compositions are petroleum oils; synthetic aromatic hydrocarbons such as the phenylene oxides and diphenylene oxides disclosed in U.S. Pat. No. 1,905,850, the terphenyls disclosed in U.S. Pat. No. 2,033,702, and the phenoxybiphenyls and phenoxyterphenyls disclosed in U.S. Pat. No. 3,957,666; and polyalkylene glycol type copolymers of ethylene oxide and propylene oxide having molecular weights of from about 400 to about 1,200, such as the polymers of UCON ® HTF-500 heat transfer fluid available from Union Carbide Corporation, described in the product brochure entitled "UCON ® Heat Transfer Fluid 500" published in 1981, and Poly-G WS-280X, available from Olin Corporation, described in the product brochure entitled "Poly-G WS-280X Heat Transfer Fluid", published in 1982.

Of the previously cited fluids, petroleum oils are the least desirable. These compositions generally have rapid rates of degradation, high flash points, high vapor pressures, low thermal efficiency, and tend to form system-fouling varnishes and sludges as degradation products.

Unlike petroleum oils and polyalkylene glycols, synthetic aromatics have the advantage of providing a broad range of service temperatures, oftentimes up to about 700° F. However, these compositions have disadvantageously low flash points, (typically below operating temperatures, necessitating the use of pressurized systems capable of separating the fluid from air), present potential toxicity problems, and are relatively poor lubricants.

For systems operating at temperatures up to about 500° F., polyalkylene glycols stabilized by the addition thereto of at least one antioxidant are the indirect liquid phase heat transfer fluids of choice. At these service temperatures polyalkylene glycols have low viscosities, relatively slow rates of thermal degradation, high thermal efficiency, excellent lubricity and resistance to the formation of system-fouling degradation products. At temperatures in excess of 500° F., however, the previously cited polyalkylene glycols available as heat transfer fluids tend to decompose at relatively rapid rates.

The relative stability of a polymer in use as a heat transfer fluid may be considered in relation to viscosity changes as function of time at a given temperature. After a certain period of elevated temperature use petroleum oils, synthetic aromatic hydrocarbons and polyalkylene glycols all experience viscosity increase as a result of thermal and oxidative degradation, however, it is the rate of viscosity increase which limits the useful service life of a polymer at a particular temperature. The rate at which viscosity increases is also generally indicative of the thermal efficiency of a polymer, the coefficient of thermal conductivity varying approximately inversely with the square root of viscosity.

FIG. 1, attached hereto, is illustrative of the viscosity changes with time of UCON ® HTF 500 heat transfer fluid, a 1-butanol initiated polyalkylene glycol having an average molecular weight of about 1100, and Therminol ® 66 heat transfer fluid, a modified terphenyl available from Monsanto Co., at both 500° F. and 550° F. as per the Thermal Stability Test defined following the section entitled "Examples" infra. At temperatures of about 500° F. UCON ® HTF-500 heat transfer fluid experiences initial viscosity descreases with time, whereas, Therminol ® 66 heat transfer fluid continuously increases in viscosity at a relatively steady rate. As a general rule, fluids having viscosities of less than about 100 centistokes at 100° F. normally require replacement when their viscosity in use increases by about 20 to 30 percent. At service temperatures of about 500° F., UCON ® HTF-500 heat transfer fluid experiences initial viscosity losses with the formation of some volatile, non-fouling degradation products. Until the fluid undergoes viscosity increasing degradation (i.e., some point in time beyond the scale depicted in FIG. 1) a system containing UCON ® HTF-500 heat transfer fluid may be maintained by venting off volatiles and adding small amounts of replacement fluid as needed. In contrast thereto, Therminol ® 66 heat transfer fluid which can not be so maintained is generally used until sludge formation or viscosity increases necessitate complete fluid replacement and equipment cleanout. At temperatures of about 550° F., the relatively rapid rate of thermal decomposition of UCON ® HTF-500 heat transfer fluid obviates its lower temperature advantages.

Apart from the addition of antioxidants, other methods for improving the thermal stability of polyoxyalkylene-containing compounds have been suggested. Canadian Pat. No. 928,283 discloses that the thermal stability of polyoxyalkylene compounds may be increased by the incorporation of an amino group into the polymeric chain. However, at temperatures in excess of about 500° F., nitrogen containing polyoxyalkylene compounds tend to form undesirable varnishes and/or sludges as degradation products (see Comparative Example C4).

The presence of an aromatic moiety has also linked to the stability of polyoxyalkylene-containing compounds. Alkoxylated alkyl phenols have been found to provide fluids having somewhat superior thermal stability, as compared to otherwise identical polyalkylene glycols lacking an aromatic moiety. Alkoxylated octyl phenols such as compositions available under the tradename Triton ® X-100, available from Rohn and Haas Co., have been utilized as heat transfer fluids in solder blanketing operations, however, in continuously circulating systems such compositions generally develop undesirably high viscosities (see Comparative Example C3 for thermal stability data of ethoxylated nonyl phenols).

A heat transfer fluid having the thermal stability advantages exhibited by polyalkylene glycol type fluids at temperatures up to about 500° F., usable at service temperatures in excess of about 500° F. is highly desirable.

SUMMARY OF THE INVENTION

This invention is directed to a method of indirect liquid-phase heat transfer using as a heat transfer fluid in a closed, continuously circulating system a substantially anhydrous polymer of the formula:

$$RO\text{-}[(CH_2)_xO]_y\text{-}R'$$

wherein

R and R' are independently hydrogen or $C_1$ to $C_4$ preferably $C_1$ to $C_2$, and most preferably $C_1$ aliphatic alkyls;

x is an integer having a value of 3 or 4; and y is a sufficiently large integer to provide the polymer with a molecular weight of from about 300 to about 1,000, preferably from about 300 to about 700.

In a preferred embodiment the fluid further comprises a sufficient amount of at least one stabilizer (e.g. anti-oxident or free radical inhibitor) to provide (a) a viscosity loss or (b) a viscosity gain of less than about 30%, preferably less than about 10% and most preferably less than about 5%, after approximately 500 hours of continuous use of a temperature of about 550° F. as per the Thermal Stability Test hereinafter defined.

DETAILED DESCRIPTION OF THE INVENTION

Figure 1:
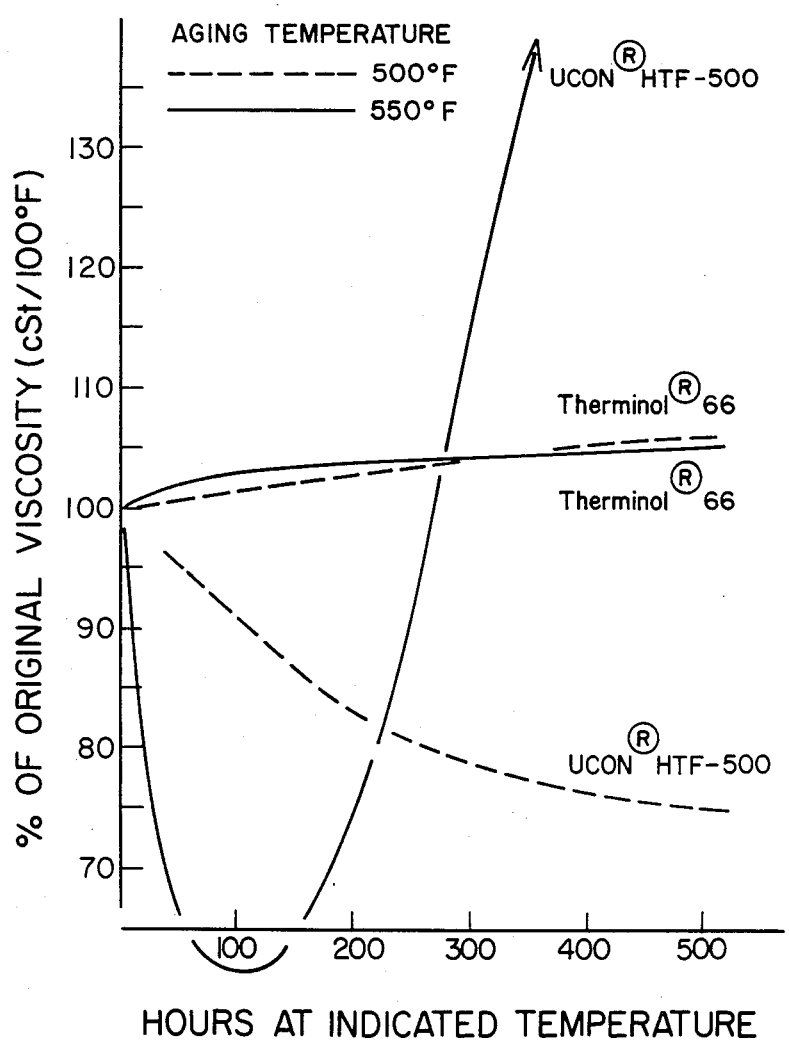

The heat transfer fluids of this invention comprise hydrogen and/or alkyl terminated poly(trimethylene oxide) or poly(tetramethylene oxide) polymers as well as mixtures thereof.

R and R' include hydrogen and linear or branched $C_1$ to $C_4$, alkyl groups such as methyl, ethyl, propyl, isopropyl and the like. As it is desirable that the homopolymers of this invention have sufficiently low viscosities to reduce system pumping stress it is preferred that the combination of trimethylene oxide or tetramethylene oxide derived units and R or R' provide a polymer having an SUS viscosity at 100° F. of less than about 100.

Commercially available poly(tetramethylene oxide) homopolymers include Terecol ® 650 available from E. I. du Pont de Nemours & Co., Inc., having a molecular weight of about 650, as well as Polymeg ® 1000 having a molecular weight of about 1000, available from Quaker Oats Corporation.

The polymers of this invention may be prepared by conventional methods such as the acid catalyzed homopolymerization of 1,3-propylene oxide or 1,4 butylene oxide (see R. W. Lenz, *Organic Chemistry of Synthetic High Polyers*, John Wiley & Sons, Inc., New York, 1967, at pp. 546-550, incorporated herein by reference). Alkyl terminated polymer groups may be prepared by various methods such as the acetylation followed by the reduction of primary hydroxyl groups of alkoxylated alcohols, the classical Williamson synthesis, dehydroformalation, and the like.

The thermal stability of the polymers may be further enhanced by the addition of one or more stabilizers.

Stabilizers suitable for reducing the rate of thermal and oxidative degradation of the polymers of this invention include phenolic compounds such as 2,2 di(4-hydroxyphenyl)propane, phenothiazine, 3,7-dioctyl phenothiazine, phenothiazine carboxylic acid esters, phenothiazines, such as N-ethyl phenothiazine, N-phenylphenothiazine, etc.; polymerized trimethyldihydroquinoline; amines, such as phenyl-α-napthylamine, phenyl-β-napthylamine, N,N'-dioctyldiphenylamine, N,N'-diphenyl-p-phenylene diamine, N,N'-di-β-napthyl-p-phenylene diamine, p-isopropoxy diphenylamine, N,N'-dibutyl-p-phenylene diamine, N,N'-bis(1,4-dimethylpentyl)-p-phenylene diamine, N,N'-diisopropyl-p-phenylene diamine, p-hydroxydiphenylamine, etc.; hindered phenols such as dibutyl cresol, 2,6-dimethyl-p-cresol, butylated 2,2-di-(4-hydroxyphenyl)propane, N-butylated aminophenol, etc.; butylated hydroxyanisoles, such as 2,6-dibutyl-p-hydroxyanisole; anthraquinone; dihydroxyanthraquinone; hyrdoquinone; 2,5-ditertiary butylhydroquinone; 2-tertiary butylhydroquinone; quinoline; p-hydroxydiphenylamine; phenylbenzoate; p-hydroxyanisol; nordihydroguaiaretic acid; pyrocatechol; styrenated phenol; polyalkyl polyphenols, propyl gallate; sodium nitrite, etc. Mixtures of the above mentioned stabilizers may be employed if desired. Stabilizers which in combination with the above described polymers produce compositions which provide no more than medium amounts, most preferably no more than slight amounts, of varnishes and/or sludges as degradation products after 500 hours of continuous use at a temperature of about 550° F. as per the Thermal Stability Test defined infra under the section entitled "Examples" are particularly desirable. Stabilizers selected from the group consisting of N,N'-diphenyl-p-phenylenediamine, phenothiazine, propyl gallate, and 3,7-dioctylphenothiazine are particularly well suited for use herein. Stabilizers combinations of phenothiazine or 3,7-dioctylphenothiazine and at least one other antioxidant, preferably, N,N'-diphenylphenylenediamine are preferred.

Other stabilizers are contemplated for use herein, the invention not being limited to the combination of the previously described polymers with those stabilizers disclosed or known, but encompassing the use of any stabilizer or stabilizer combination which enhances the oxidative and/or thermal degradation resistance of said polymers.

Typically, the stabilizers are present in the fluids of this invention in an amount of from about 0.1 to about 10.0% by weight, based upon the weight of the polymer, and oftentimes are present in an amount of from about 0.5 to about 2.0 percent by weight based on the weight of the polymer. Desirably the stabilizer has a solubility of at least 25 grams per liter of composition at 25° C.

In a preferred embodiment this invention relates to a method of circulating heat between a heat generating and a heat using source a heat transfer fluid based on an alkylene oxide adduct of a linear aliphatic alcohol, wherein the fluid has incorporated therein a thermally stabilizing amount of at least one stabilizer selected from the group consisting of N,N'-diphenyl phenylenediamine, phenothiazine, propyl gallate, and 3,7-dioctylphenothiazine.

Additives for corrosion control including at least one steel corrosion inhibitor such as a phosphate ester, dimer acid, alkyl succinic anhydride, and the like; and at least one copper corrosion inhibitior such as tolyltriazole, mercaptobenzothiazole, and the like, may also be incorporated into the compositions of this invention.

The fluids are prepared by blending the components to a homogeneous state by any conventional mixing means. Although it is not necessary to heat the solutions, gentle warming at temperatures of about 30° C. to 60° C. may facilitate dissolution of some solid stabilizers.

EXAMPLES

The following examples serve to illustrate the specific embodiments of this invention. It is not intended that the scope of the invention shall be limited by these examples. The designations which appear in the example and tables below have the following meanings:

PANA: phenyl-α-naphthylamine
PTZ: phenothiazine
DPPD: N,N'-diphenyl phenylenediamine
PEG-400: A poly(ethylene glycol) having an average molecular weight of about 400, available from Union Carbide Corporation.
NP-7: An average 7-mole ethylene oxide adduct of nonylphenol, available from Union Carbide Corporation.
UCON® HTF-500: A 1-butanol initiated ethylene oxide/propylene oxide copolymer having a molecular weight of about 1100, containing about 2% by weight of PANA.
Jeffamine® ED-900: An average 900 molecular weight primary diamine derived from propylene glycol available from Jefferson Chemical Corporation.
Terecol® 650: Poly(tetramethylene oxide) having a molecular weight of about 650.

Examples 1 to 3 and Comparative Examples $C/_1$ to $C_4$

The thermal stability of various compositions was tested by means of the following Thermal Stability Test. Into a 700 ml cylindrical glass flask having a diameter of about 7 cm equipped with a first side arm connect to a nitrogen inlet and a second side arm connected to a conventional air-cooled condenser, was charged approximately 360 of the fluid to be tested. A thermocouple capable of continuously monitoring the temperature of the flask was inserted through the top of the flask and positioned approximately 4 cm from the bottom of the flask. The thermocouple was connected to a heating source surrounding the bottom and sides of the flask that maintained the system at a constant preselected temperature of about 550° F. A nitrogen sparge of 1 cc/min created an inert atmosphere over the fluid sample and provided a means of fluid agitation. The test was run for a period of about 500 hours during which time the flask contents were examined at approximately equal intervals and the descriptions thereof reported.

For purposes of describing the by-products produced by this test the following definitions shall apply:

Varnish-A thin adherent film of solid black charred film found on the wall of a container near the fluid surface. The amount of varnish observed is rated according to the width of the black band remaining on the container wall after the fluid is removed and the container rinsed with acetone. Ratings are as follows:
None: No visible band
Trace: Up to a ¼ inch band
Slight: ¼ to ¾ inch band
Medium: ¾ to 1¾ inch band
Heavy: A band in excess of 1¾ inch Sludge-Fine black char particles formed individually within the fluid during aging. When particles were too fine to settle or the fluid too viscous to facilitate particle settling within a day after the test the product was reported as a "dispersed" sludge. The amount of sludge observed following particle settling is rated as follows:
None-Fluid essentially free of char particles
Trace-Partial coverage of container bottom by a very thin sludge layer (Dry Solids Estimated at about 0.01 weight percent of sample)
Slight-Thin sludge layer covers container bottom (Dry Solids Estimated at about 0.02 weight percent of sample)
Medium-thicker sludge layer on container bottom (Dry Solids Estimated at about 0.04 weight percent of sample).

The initial viscosities at 100° F. and the viscosity changes of the samples as per the Thermal Stability Test conducted at 550° F. for a period of 500 hours, are given in Table I below.

TABLE 1

| Composition | % Antioxidant | Initial viscosity Cst at 100° F. | % loss (gain) in viscosity after 500 hours | Solids formed varnishes | sludges |
| --- | --- | --- | --- | --- | --- |
| $E_1$ Terecol ® 650 | 1% PTZ, 1% DPPD | 196 | 24 | medium | none |
| $C_1$ PEG 400 | 2% DPPD | 48 | syrup | heavy | dispersed |
| $C_2$ UCON ® HTF-500 | 2% PANA | 58 | syrup | medium | dispersed |
| $C_3$ NP-7 | 1% PTZ, 1% DPPD | 110 | $(450)^1$ | slight | trace |
| $C_4$ Jeffamine ® ED-900$^2$ | 2% PTZ | 69 | $(50)^3$ | medium | slight |

[1]After 430 hours.
[2]Jeffamine ® ED-900 was subjected to the Thermal Stability Test at a system temperature of 500° F. as opposed to 550° F.
[3]After 260 hours.

What is claimed is:
1. A method of liquid phase heat transfer which comprises continuously circulating between a heat generating and a heat using source a substantially anhydrous polymer of the formula:

$$RO\text{---}[(CH_2)_xO]_y\text{---}R'$$

wherein
R and R' are independently hydrogen or a $C_1$ to $C_4$ aliphatic alkyl;
x is an integer having a value of 3 or 4; and
y is a sufficiently large integer to provide the polymer with a molecular weight of from about 300 to about 1,000.

2. The method of claim 1 wherein a stabilizer capable of reducing the rate of thermal degradation of the polymer is also present.

3. The method of claim 2 wherein the stabilizer is present in an amount of from about 0.1 to about 10 weight percent based on the weight of the polymer.

4. The method of claim 3 wherein the stabilizer is selected from the group consisting of N,N'-diphenylphenylene diamine, phenothiazine, propyl gallate and 3,7-dioctyl phenothiazine.

5. The method of claim 4 wherein the stabilizer comprises a combination of phenothiazine or 3,7-dioctyl phenothiazine, and at least one other stabilizer.

6. The method of claim 5 wherein x is 4 and y is a sufficiently large integer to provide the polymer with a molecular weight of from about 300 to about 700 and R and R' are methyl groups.

7. The method of claim 6 wherein the polymer has an SUS viscosity at 100° F. of less than about 100 centistokes.

8. A method of liquid phase heat transfer which comprises continuously circulating between a heat generating and a heat using source a composition comprising (a) a substantially anhydrous polymer of the formula:

$$RO\text{--}[(CH_2)_xO]_y\text{--}R'$$

wherein
R and R' are independently hydrogen or a $C_1$ to $C_4$ aliphatic alkyl;
x is an integer having a value of 3 or 4; and
y is a sufficiently large integer to provide the polymer with a molecular weight of from about 300 to about 1,000, and (b) a sufficient amount of at least one stabilizer to provide (i) a viscosity loss or (ii) a viscosity gain of less than about 30%, after approximately 500 hours of continuous use at a temperature of about 550° F. as per the Thermal Stability Test.

9. The method of claim 8 wherein the stabilizer is selected from the group consisting of phenothiazine, 3,7-dioctyl-phenothiazine, N,N'-diphenylenediamine and propyl gallate.

10. The method of claim 8 wherein the stabilizer comprises phenothiazine or 3,7-dioctyl phenothiazine, and at least one other stabilizer.

11. The method of claim 10 wherein the other stabilizer is N,N'-diphenylenediamine.

12. The method of claim 8 wherein after 500 hours of continuous use as a heat transfer fluid at a temperature of about 550° F. no more than slight amounts of varnishes and/or sludges are produced.

13. The method of claim 8 wherein the polymer has an SUS viscosity at 100° F. of less than about 100 centistokes.

* * * * *